United States Patent
Kusaka et al.

(10) Patent No.: US 12,087,154 B2
(45) Date of Patent: Sep. 10, 2024

(54) READING SYSTEM, READING METHOD, AND STORAGE MEDIUM

(71) Applicant: KABUSHIKI KAISHA TOSHIBA, Tokyo (JP)

(72) Inventors: Tsubasa Kusaka, Yokohama (JP); Chiayu Lin, Ota (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 825 days.

(21) Appl. No.: 17/078,336

(22) Filed: Oct. 23, 2020

(65) Prior Publication Data
US 2021/0043072 A1 Feb. 11, 2021

Related U.S. Application Data

(63) Continuation of application No. PCT/JP2019/011727, filed on Mar. 20, 2019.

(30) Foreign Application Priority Data

Apr. 27, 2018 (JP) ................. 2018-087716

(51) Int. Cl.
*G01D 4/00* (2006.01)
*G06T 7/60* (2017.01)
(Continued)

(52) U.S. Cl.
CPC ........... *G08C 19/36* (2013.01); *G06T 7/60* (2013.01); *G06V 10/40* (2022.01); *H04Q 9/00* (2013.01);
(Continued)

(58) Field of Classification Search
CPC ........ G01D 4/004; G01D 4/002; G06F 18/00; G06V 2201/02
See application file for complete search history.

(56) References Cited

U.S. PATENT DOCUMENTS

| 8,594,365 B2* | 11/2013 | Derkalousdian ........ G06F 18/00 |
| | | 382/152 |
| 10,354,137 B2* | 7/2019 | Russell .................. G06V 20/00 |
| | | (Continued) | |

FOREIGN PATENT DOCUMENTS

| JP | 3-100424 A | 4/1991 |
| JP | 7-19814 A | 1/1995 |
| | (Continued) | |

OTHER PUBLICATIONS

International Search Report dated Apr. 23, 2019 in PCT/JP2019/011727 filed Mar. 20, 2019, 1 page.

*Primary Examiner* — Lam S Nguyen
(74) *Attorney, Agent, or Firm* — Oblon, McClelland, Maier & Neustadt, L.L.P.

(57) ABSTRACT

According to one embodiment, a reading system includes a calculator and a determiner. The calculator calculates a total value of luminances and fluctuation of the luminances in at least a portion of a second direction at each of a plurality of points in a first direction for at least a portion of an image subjected to a polar transformation. A meter is imaged in the image and includes a pointer, a display panel, and graduations. The pointer rotates around a rotation axis. The graduations are arranged along a circumferential direction around the rotation axis on the display panel. The polar transformation is referenced to a center of the meter. The first direction corresponds to the circumferential direction. The second direction corresponds to a diametrical direction from the center toward the graduations. The determiner uses the total value and the fluctuation to determine a position at which the pointer exists.

24 Claims, 13 Drawing Sheets

(51) Int. Cl.
*G06V 10/40* (2022.01)
*G08C 19/36* (2006.01)
*H04Q 9/00* (2006.01)

(52) U.S. Cl.
CPC ... *G06V 2201/02* (2022.01); *H04Q 2213/002* (2013.01)

(56) References Cited

U.S. PATENT DOCUMENTS

| | | | |
|---|---|---|---|
| 2001/0055425 | A1 | 12/2001 | Chiu |
| 2005/0219632 | A1 | 10/2005 | Maki et al. |
| 2006/0268359 | A1 | 11/2006 | Maki et al. |
| 2012/0201423 | A1 | 8/2012 | Onai et al. |
| 2016/0109263 | A1* | 4/2016 | Dubs ............ G08C 17/02 348/160 |
| 2018/0089811 | A1 | 3/2018 | Shin |
| 2021/0043072 | A1 | 2/2021 | Kusaka et al. |

FOREIGN PATENT DOCUMENTS

| | | | |
|---|---|---|---|
| JP | 2002-288777 | A | 10/2002 |
| JP | 2004-133560 | A | 4/2004 |
| JP | 2005-32028 | A | 2/2005 |
| JP | 2005-267365 | A | 9/2005 |
| JP | 2005-341452 | A | 12/2005 |
| JP | 2006-120133 | A | 5/2006 |
| JP | 2007-114828 | A | 5/2007 |
| JP | 2008-243103 | A | 10/2008 |
| JP | 2009-75848 | A | 4/2009 |
| JP | 2011-90374 | A | 5/2011 |
| JP | 2012-104032 | A | 5/2012 |
| JP | 5712801 | B2 | 5/2015 |
| JP | 2016-162412 | A | 9/2016 |
| JP | 2017-126187 | A | 7/2017 |
| JP | 2018-1013 | A | 1/2018 |
| JP | 2018-56702 | A | 4/2018 |
| JP | 2019-169116 | A | 10/2019 |
| JP | 6609345 | B2 | 11/2019 |
| JP | 2020-95467 | A | 6/2020 |
| JP | 6763060 | B1 | 9/2020 |

\* cited by examiner

FIG. 2A
FIG. 2B
FIG. 2C
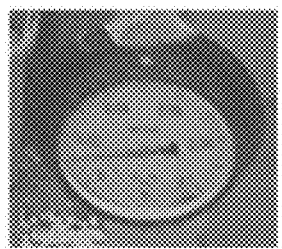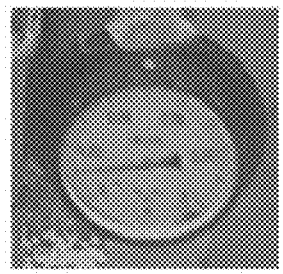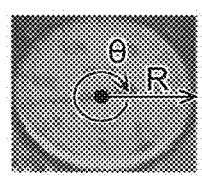
FIG. 2D
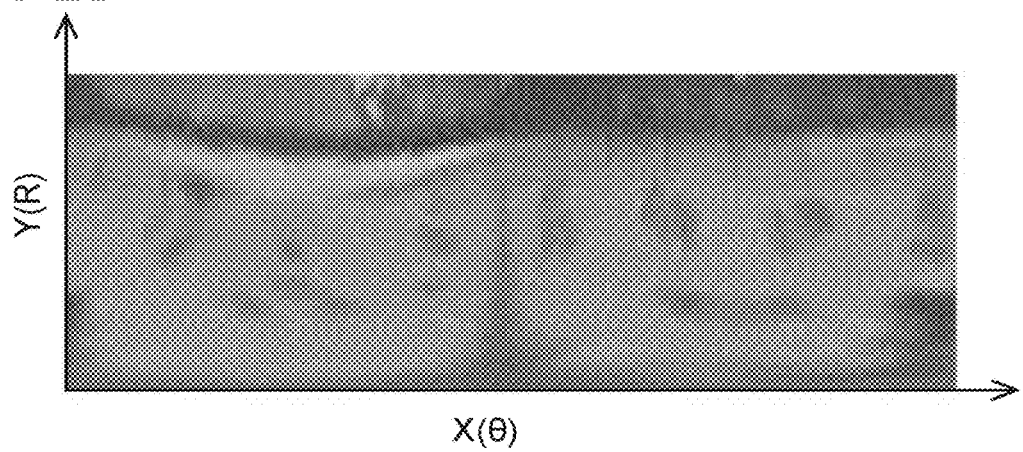
FIG. 2E
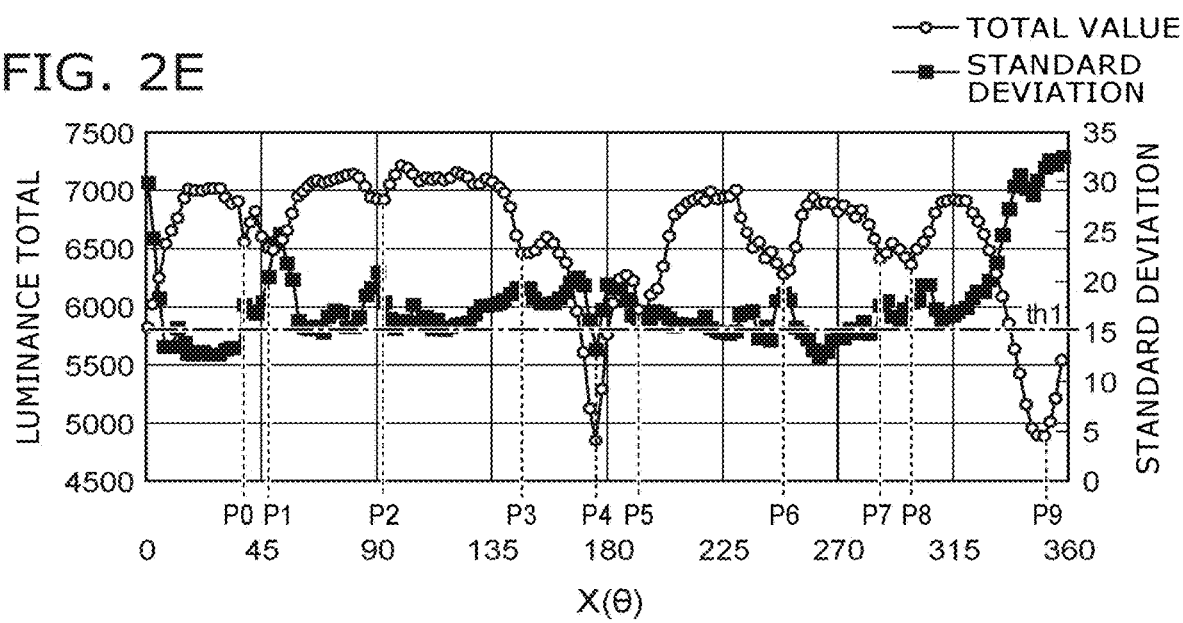

READING SYSTEM, READING METHOD, AND STORAGE MEDIUM

CROSS-REFERENCE TO RELATED APPLICATIONS

This is a continuation application of International Patent Application PCT/JP2019/011727, filed on Mar. 20, 2019. This application also claims priority to Japanese Patent Application No. 2018-087716, filed on Apr. 27, 2018. The entire contents of each are incorporated herein by reference.

FIELD

Embodiments described herein relate generally to a reading system, a reading method, and a storage medium.

BACKGROUND

There is a system that reads a numerical value indicated by a round meter. It is desirable for the system to have high accuracy of reading the numerical value.

BRIEF DESCRIPTION OF THE DRAWINGS

FIGS. 2A to 2E illustrate processing according to the reading system according to the embodiment;

DETAILED DESCRIPTION

Figure 1:
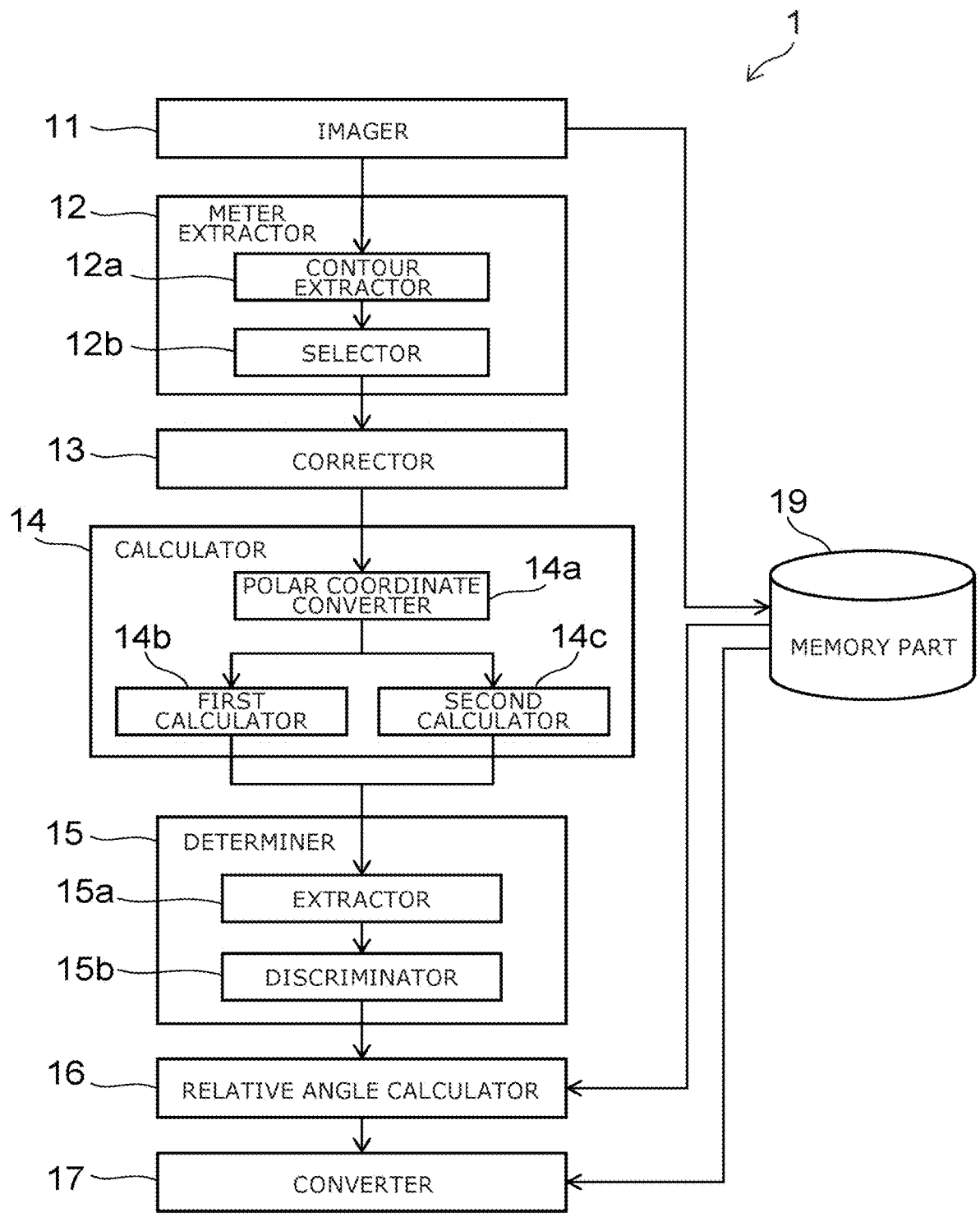
FIG. 1 is a block diagram illustrating a configuration of a reading system according to an embodiment.

According to one embodiment, a reading system includes a calculator and a determiner. The calculator calculates a total value of luminances in at least a portion of a second direction and fluctuation of the luminances in the at least a portion of the second direction at each of a plurality of points in a first direction for at least a portion of an image subjected to a polar transformation. A meter is imaged in the image. The meter includes a pointer, a display panel, and a plurality of graduations. The pointer rotates around a rotation axis. The plurality of graduations are arranged along a circumferential direction around the rotation axis on the display panel. The polar transformation is referenced to a center of the meter. The first direction corresponds to the circumferential direction. The second direction corresponds to a diametrical direction from the center toward the graduations. The determiner uses the total value and the fluctuation to determine a position at which the pointer exists.

Various embodiments are described below with reference to the accompanying drawings.

In the specification and drawings, components similar to those described previously or illustrated in an antecedent drawing are marked with like reference numerals, and a detailed description is omitted as appropriate.

FIG. 1 is a block diagram illustrating a configuration of a reading system according to an embodiment.

The reading system 1 according to the embodiment is used to read a numerical value indicated by a pointer in a meter from an image in which the meter is imaged. The reading system 1 according to the embodiment is used favorably for a meter including a pointer rotating around a rotation axis, and multiple graduations arranged along a circumferential direction around the rotation axis. In the meter to be read, the multiple graduations may be arranged in a circular or circular arc-like configuration. The meter further includes a display panel on which the multiple graduations are marked, and numerical values marked to correspond to at least a portion of the multiple graduations. Typically, in such a meter, the outer rim, the outer frame, and the like of the display panel are circular. In the description of the embodiments hereinafter, such a meter is called a round meter.

As illustrated in FIG. 1, the reading system 1 according to the embodiment includes an imager 11, a meter extractor 12, a corrector 13, a calculator 14, a determiner 15, a relative angle calculator 16, a converter 17, and a memory part 19.

FIGS. 2A to 2E illustrate processing according to the reading system according to the embodiment. The processing according to the reading system 1 according to the embodiment will now be described in detail with reference to FIGS. 2A to 2E.

The imager 11 acquires a static image by imaging a round meter. The imager 11 outputs the acquired image to the meter extractor 12. The imager 11 may store the image in the memory part 19. When a video image is imaged by the imager 11, a static image is cut out from the video image and output to the meter extractor 12. An object other than a round meter may be imaged in the image.

The meter extractor 12 extracts, from the image acquired by the imager 11, a portion in which the round meter is imaged. The meter extractor 12 outputs the extracted portion to the corrector 13. FIG. 2A illustrates an example of the extracted portion.

As one specific example, the meter extractor 12 includes a contour extractor 12a and a selector 12b. In the description, the image that is imaged by the imager 11 and input to the meter extractor 12 is called the input image.

For example, the contour extractor 12a extracts a contour included in the input image based on a brightness difference of the input image. The contour extractor 12a may perform additional processing of the image as appropriate when extracting the contour. For example, the contour extractor 12a may convert the input image into a grayscale, subsequently binarize the image, and extract a contour of a region illustrated using white from the binary image.

The selector 12b calculates the surface area of the region surrounded with the contour. When multiple contours are extracted, the surface area of each region is calculated. The selector 12b compares each calculated surface area to a prescribed threshold and selects only the regions for which the surface area is not less than the threshold. Thereby, regions that have surface areas that are too small are excluded, and only the regions that have a high likelihood of the round meter being imaged are selected. The selector 12b extracts (cuts out), from the input image, a portion corresponding to the selected region. The selector 12b outputs the extracted portion to the corrector 13.

When the image that is input is distorted, the corrector 13 corrects the image to approach the image when viewed from the front. For example, the corrector 13 corrects the image by performing a projective transformation. In the example of the image illustrated in FIG. 2A, the outer edge of the display panel is elliptical. By the correction by the corrector 13, the image illustrated in FIG. 2A is corrected to the image illustrated in FIG. 2B. Thereby, the outer edge of the display panel approaches a perfect circle. The corrector 13 outputs the corrected image to the calculator 14.

The calculator 14 includes, for example, a polar coordinate converter 14a, a first calculator 14b, and a second calculator 14c.

The polar coordinate converter 14a detects the center of the round meter included in the image after the conversion.

For example, the calculator 14 detects the outer edge of the display panel of the round meter based on the luminance difference of the image. When the outer edge of the display panel is circular, the calculator 14 approximates the outer edge as a perfect circle. The calculator 14 uses the center of the perfect circle as the center of the round meter.

When the outer edge of the display panel is not circular, the calculator 14 may detect the center of the round meter by using the multiple graduations marked on the display panel. Specifically, when the graduations are linear, the calculator 14 generates a virtual straight line along each graduation. The calculator 14 detects the intersections of the straight lines and uses the position of the centroid of the multiple intersections as the center of the round meter.

The polar coordinate converter 14a performs a polar transformation of the image referenced to the detected center of the round meter. For example, the following Formula (1) and Formula (2) are used in the polar transformation. The image may be grayscaled or binarized as appropriate before performing the polar transformation. For example, the image illustrated in FIG. 2D is generated by performing a polar transformation of the image illustrated in FIG. 2B. A circumferential direction (an angle) θ of the round meter illustrated in FIG. 2C corresponds to an X-direction (a first direction) illustrated in FIG. 2D. A radial direction R of the round meter corresponds to a Y-direction (a second direction) orthogonal to the X-direction.

$$X = R \cos \theta \quad (1)$$

$$Y = R \sin \theta \quad (2)$$

The angle in the round meter is calculated using a prescribed line as a reference. For example, the polar coordinate converter 14a generates a virtual ray extending rightward horizontally from the center of the round meter. When calculating the angle of a point in the image, the polar coordinate converter 14a generates another ray connecting the point and the vertex (the center of the round meter). The polar coordinate converter 14a calculates, as the angle of the point, the angle between the other ray and the ray used as the reference.

The first calculator 14b uses the result of the polar transformation to calculate the total value of the luminances in the Y-direction at each of multiple points in the X-direction. The second calculator 14c calculates the fluctuation of the luminances in the Y-direction at each of the multiple points in the X-direction. The first calculator 14b and the second calculator 14c output the calculated results to the determiner 15.

When the luminance of a pixel has 256 gradations from 0 to 255, the gradations of the luminance of all of the pixels arranged in the Y-direction are totaled, and the totaled value is used as the total value of the luminances. This is similar even when the image is binary. "0" or "1" that represents the luminance is totaled for all of the pixels arranged in the Y-direction, and the totaled value is used as the total value of the luminances. The total value increases as more bright pixels are arranged in the Y-direction.

For example, the fluctuation of the luminances is calculated by the following method. First, the average value of the luminances in the Y-direction is calculated. Then, the standard deviation of the luminances in the Y-direction is calculated using the average value. The standard deviation is used as the fluctuation of the luminances. Or, the variance, the root mean square, the contrast ratio, the interquartile range (IQR), etc., of the luminances in the Y-direction may be used as the fluctuation of the luminances.

For example, a contrast ratio CR is represented by the following Formula (3). $I_{max}$ is the maximum value of the luminance in the Y-direction. $I_{min}$ is the minimum value of the luminance in the Y-direction.

$$CR = (I_{max} - I_{min}) / (I_{max} + I_{min}) \quad (3)$$

For example, the total value of the luminances and the fluctuation of the luminances are calculated at each of multiple points in the X-direction for the image illustrated in FIG. 2D. FIG. 2E illustrates the calculation result. In the graph of FIG. 2E, the round plots are the total value of the luminances, and the rectangular plots are the standard deviation (the fluctuation of the luminances). The horizontal axis is the position in the X-direction (i.e., the angle). The vertical axis at the left side is the total value of the luminances. The vertical axis at the right side is the fluctuation of the luminances. For convenience, the angles that correspond to the positions are labeled at the horizontal axis of FIG. 2E.

The determiner 15 uses the total value of the luminances and the fluctuation of the luminances to determine the position in the X-direction where the pointer of the round meter exists. The position in the X-direction in the image after the polar transformation is the angle having the center of the round meter as the vertex in the image before the polar transformation. In other words, the angle at which the pointer exists is obtained by determining the position in the X-direction where the pointer exists.

As one specific example, the determiner 15 includes an extractor 15a and a discriminator 15b. A case will now be described in which the color of the display panel is relatively bright and the color of the pointer is relatively dark in the round meter to be read.

By using the calculation result of the calculator 14, the extractor 15a extracts a position in the X-direction where the luminance has a minimum in the image after the polar transformation. Multiple extracted positions may be extracted. The extracted position is a candidate of a position at which the pointer exists. This is because the total value of the luminances in the Y-direction at the position at which the pointer exists is less than that of the other positions when the color of the pointer is darker than the color of the display panel.

The discriminator 15b refers to the fluctuation of the luminances at each of the extracted positions. For example, the discriminator 15b compares the fluctuation of the luminances to a first threshold for each of the extracted positions. From the extracted positions, the discriminator 15b discriminates a position at which a fluctuation that is not more than the first threshold is obtained to be the position at which the pointer exists.

There are cases where multiple positions are included in the candidates extracted by the extractor 15a. For example, the position of one end portion of the pointer and the position of the other end portion of the pointer are included at such positions. The one end portion and the other end portion are end portions in the direction in which the pointer extends. The one end portion of the pointer is the portion indicating the region where the graduations are arranged, and the other end portion of the pointer is at an opposite position so that the rotation axis is sandwiched between the other end portion and the one end portion. The one end portion is the position more proximately to the region where the graduations are arranged than is the other end portion. The distance between the one end portion and the rotation axis is greater than the distance between the other end portion and the rotation axis. Hereinafter, the one end portion of the pointer recited above is called the "tip", and the other end portion recited above is called the "back end".

According to the round meter, the back end of the pointer may protrude past the center of the display panel away from the tip. In such a case, the position of the pointer tip and the position of the pointer back end may be extracted as candidates of the position at which the pointer exists.

However, in such a case as well, the distance between the center and the tip of the pointer is greater than the distance between the back end and the center. Therefore, fewer pixels of the color of the display panel exist in the Y-direction at the position at which the tip of the pointer exists than at the position at which the back end of the pointer exists. In other words, more pixels having low luminances and fewer pixels having high luminances exist at the position at which the tip of the pointer exists than at the position at which the back end of the pointer exists. As a result, the fluctuation of the luminances in the Y-direction is smaller at the position at which the tip of the pointer exists than at the position at which the back end of the pointer exists. Accordingly, the position at which the pointer exists can be discriminated by using the fluctuation of the luminances.

In the example illustrated in FIG. 2D, multiple positions P0 to P9 where the luminance has minima are extracted by the extractor 15a. The total value of the luminances is markedly small at the positions P4 and P9 compared to the other positions. This shows that the tip of the pointer exists at one of the position P4 or P9, and the back end of the pointer exists at the other of the position P4 or P9. From the multiple extracted positions, the discriminator 15b discriminates, as the position at which the pointer exists, the position P4 at which the fluctuation of the luminances is not more than a first threshold th1.

In the image after the polar transformation, the position in the X-direction represents the angle having the center of the round meter as the vertex as shown in the horizontal axis of FIG. 2D. Accordingly, it can be seen that the pointer exists at the angle corresponding to the discriminated position.

The memory part 19 stores information relating to the graduations of the round meter. Specifically, a table of a correspondence between the angle of the pointer and the numerical value indicated by the pointer, the maximum value and the minimum value of the numerical values marked on the graduations, etc., are stored in the memory part 19. Based on the information of the memory part 19, the converter 17 converts the angle at which the pointer exists into a numerical value. The numerical value that is indicated by the pointer is obtained thereby. For example, the converter 17 outputs the converted numerical value to the outside.

The table of the memory part 19 is of a correspondence between the angle of the pointer and the numerical values in a state in which the round meter is disposed at a position having some reference. For example, there are cases where the round meter that is imaged by the imager 11 is rotated some angle with respect to the reference position. In such a case, if the angle at which the pointer exists is converted to a numerical value by referring to the table, an error of the amount of the rotated angle occurs.

Therefore, for the angles recited above, it is desirable for the angle acquired by the determiner 15 to be corrected by the relative angle calculator 16. The relative angle calculator 16 calculates a relative rotation angle (the relative angle) between the round meter that is imaged and the reference position of the round meter.

For example, the positional relationship of the graduation corresponding to the minimum value and the graduation corresponding to the maximum value of the round meter to be read are stored in the memory part 19. In a general round meter, the graduations are marked consecutively in a direction from the graduation of the minimum value toward the graduation of the maximum value. Also, in the reverse direction, the graduation of the minimum value and the graduation of the maximum value are separated from each other. The direction in which the graduation of the minimum value and the graduation of the maximum value are separated and the distance between the graduations are stored as the information of the positional relationship in the memory part 19. The relative angle calculator 16 detects the positional relationship between the graduation of the minimum value and the graduation of the maximum value from the corrected image. The relative angle calculator 16 calculates the relative angle by comparing the detected positional relationship to the positional relationship stored in the memory part 19.

Or, the relative angle calculator 16 may calculate the relative angle from the corrected image. For example, the relative angle calculator 16 recognizes the multiple numerical values marked on the display panel by using technology such as OCR (Optical Character Recognition), pattern matching, etc. Then, the relative angle calculator 16 detects the tilts of the recognized multiple numerical values and uses the average of the tilts as the tilt (the relative angle) of the round meter.

The relative angle calculator 16 adds or subtracts the calculated rotation angle to or from the angle acquired by the determiner 15. The converter 17 converts the angle calculated by the relative angle calculator 16 into a numerical value. The reading accuracy of the numerical value is increased thereby.

Figure 3:
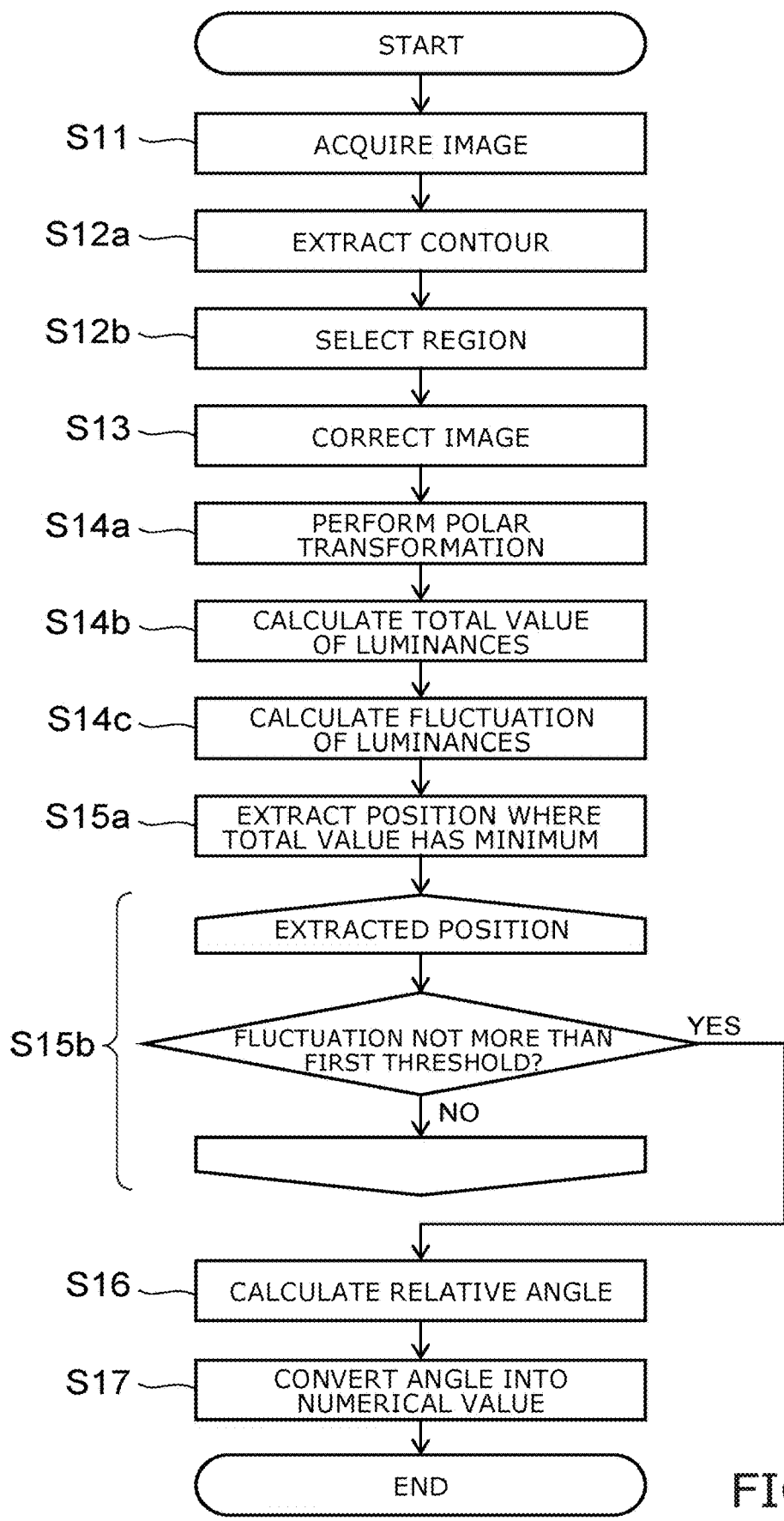
FIG. 3 is a flowchart illustrating an operation of the reading system according to the embodiment.

FIG. 3 is a flowchart illustrating an operation of the reading system according to the embodiment.

First, the imager 11 acquires an image by imaging a round meter (step S11). Then, the contour extractor 12a extracts a contour of the image (step S12a). The selector 12b selects a contour that has not less than a prescribed surface area (step S12b). When the image corresponding to the selected contour is distorted, the corrector 13 corrects the distortion (step S13). The polar coordinate converter 14a performs a polar transformation of the corrected image (step S14a). The first calculator 14b calculates the total value of the luminances in the Y-direction for each of multiple points in the X-direction (step S14b). The second calculator 14c calculates the fluctuation of the luminances in the Y-direction for each of the multiple points in the X-direction (step S14c).

The extractor 15a extracts the positions in the X-direction where the total value of the luminances has a minimum (step S15a). The discriminator 15b compares the fluctuation of the luminances to the first threshold at each of the extracted positions. A position at which the fluctuation is not more than the first threshold is discriminated thereby (step S15b). The relative angle calculator 16 calculates the relative angle between the round meter that is imaged and the state of the round meter stored in the memory part 19 (step S16). The converter 17 uses the calculated relative angle to convert the angle corresponding to the discriminated position into a numerical value (step S17).

The sequence of the steps described above is modifiable as appropriate. For example, the calculation of the fluctuation of the luminances (step S14c) may be performed after the extraction of the position (step S15a). The calculation of the relative angle (step S16) may be performed before the polar transformation of the image (step S14a) or before the extraction of the position (step S15a). When calculating the relative angle from the tilts of the multiple numerical values, the calculation of the tilts may be performed before the polar transformation of the image (step S14a).

Effects of the embodiments will now be described.

Initially, a reading system according to a reference example will be described. In the reading system according to the reference example, a polar transformation is performed for an image in which a round meter is imaged. The total value of the luminances in the Y-direction is calculated for each of multiple points in the X-direction. The pointer is detected based on the total values. According to this method, the pointer can be detected with high accuracy even when the image is unclear. The pointer can be detected with high accuracy even when a seal or the like is adhered to the round meter and a portion of the pointer cannot be viewed.

However, as described above, there are cases where it is difficult to discriminate between the tip and the back end of the pointer in the detection based on the total value of the luminances. If the tip and the back end of the pointer cannot be discriminated when the rotation range of the pointer is 180 degrees or more, the numerical value that is indicated by the pointer cannot be read.

Therefore, in the reading system 1 according to the embodiment, the position at which the pointer exists is discriminated using the fluctuation of the luminances as well. As described above, the fluctuations of the luminances are different between the position at which the tip of the pointer exists and the position at which the back end of the pointer exists. By using the fluctuation of the luminances, the tip of the pointer can be discriminated with high accuracy.

Accordingly, according to the reading system 1 according to the embodiment, the accuracy of the reading of the indicated numerical value can be increased particularly for a round meter in which the rotation range of the pointer is 180 degrees or more.

There are cases where many dark pixels are included in the rotation axis portion or the graduation portion of the pointer according to the shape of the pointer, the resolution of the image that is imaged, etc. In such a case, the calculator 14 may calculate the total value of the luminances or the fluctuation of the luminances in the Y-direction after excluding such portions.

For example, the first calculator 14b calculates the total value of the luminances in the Y-direction after excluding at least one of the portion including the rotation axis or the portion including the graduations of the pointer from the image having undergone the polar transformation. The second calculator 14c calculates the fluctuation of the luminances in the Y-direction after excluding at least one of the portion including the rotation axis or the portion including the graduations of the pointer from the image having undergone the polar transformation.

Or, the polar coordinate converter 14a may perform the polar transformation of the image after excluding at least one of the portion including the rotation axis or the portion including the graduations of the pointer. However, the processing can be fast in the image having undergone the polar transformation because the portions to be excluded are rectangular. For faster processing, it is desirable for the rotation axis portion and the graduation portion to be excluded from the calculations of the first calculator 14b and the second calculator 14c described above.

There are cases where a seal or the like is adhered to the front surface of the round meter. There is a possibility of erroneous detection of the position of the pointer when calculating the total value of the luminances and the fluctuation of the luminances if the luminance of the portion where the seal is adhered is included in the calculation. In particular, the likelihood of an erroneous detection becomes high when the color of the seal has low reflectance such as black, red, etc. Accordingly, when a seal is adhered to the round meter, the calculator 14 may calculate the total value of the luminances or the fluctuation of the luminances in the Y-direction after excluding the portion of the seal from the image.

For example, the polar coordinate converter 14a performs the polar transformation of the image after excluding the portion where the seal is adhered. The portion where the seal is adhered is prestored in the memory part 19. The first calculator 14b and the second calculator 14c calculate the total value of the luminances and the fluctuation of the luminances after excluding the seal from the image having undergone the polar transformation.

Or, the first calculator 14b and the second calculator 14c may calculate the total value of the luminances and the fluctuation of the luminances after excluding the portion including the seal from the image having undergone the polar transformation. However, for faster processing, it is desirable to perform the polar transformation of the image after excluding the seal. Typically, the exterior form of such a seal is rectangular. Therefore, if the polar transformation is performed for the portion including the seal, the portion no longer is rectangular, and the processing becomes complex.

In the description of the example described above, the color of the display panel is relatively bright, and the colors of the pointer and the graduations are relatively dark; however, the round meter that is readable by the reading system 1 according to the embodiment is not limited to the example. In the round meter to be read, the color of the display panel may be relatively dark, and the colors of the pointer and the graduations may be relatively bright. In such a case, compared to the other positions, many bright pixels exist at the position at which the pointer exists in the image after the polar transformation. Accordingly, the extractor 15a extracts the position at which the total value of the luminances in the Y-direction has a maximum. The discriminator 15b extracts the position at which the pointer exists by using the fluctuation of the luminances in the Y-direction from the extracted position.

When multiple positions are extracted by the extractor 15a, the discriminator 15b may discriminate the position at which the pointer exists by the following processing. The discriminator 15b verifies whether or not two positions corresponding to diagonal in the meter are included in the multiple positions. Two positions that correspond to diagonal in the meter refer to when the difference between the angle corresponding to one position and the angle corresponding to the other position is substantially 180 degrees. A tolerable difference may be set for such an angle difference based on the performance of the imager 11, the resolution of the image, etc. When two positions corresponding to diagonal exist, the tip and the back end of the pointer exist at these positions. The discriminator 15b compares the fluctuations of the luminances between these positions, and discriminates that the pointer exists where the fluctuation is smaller.

In the description described above, the determiner 15 includes the extractor 15a and the discriminator 15b. The processing of the determiner 15 is not limited to the example. For example, the determiner 15 may perform, in parallel, the extraction of the position at which the total value of the luminances has an extremum and the extraction of the position at which the fluctuation of the luminances is not more than the first threshold. The determiner 15 determines the position that satisfies both conditions to be the position at which the pointer exists. Or, the determiner 15 may extract the range of the positions at which the fluctuation of the luminances is not more than the first threshold and may perform the discrimination for the positions in the range at which the total values of the luminances have extrema. In other words, the specific processing of the determiner 15 is modifiable as appropriate as long as a position can be found at which the total value of the luminances has a minimum value or a maximum value and the fluctuation of the luminances is not more than the first threshold.

In the example of the description described above, the reading system 1 includes the imager 11, the meter extractor 12, and the corrector 13; however, the reading system 1 may not include these components. For example, these components are unnecessary when an image for which the distortion is corrected is input to the reading system 1.

Desirable forms and modifications of the reading system 1 according to the embodiment will now be described. The forms that include the modifications described below can be implemented in combination with each other as appropriate.

Figure 4A:
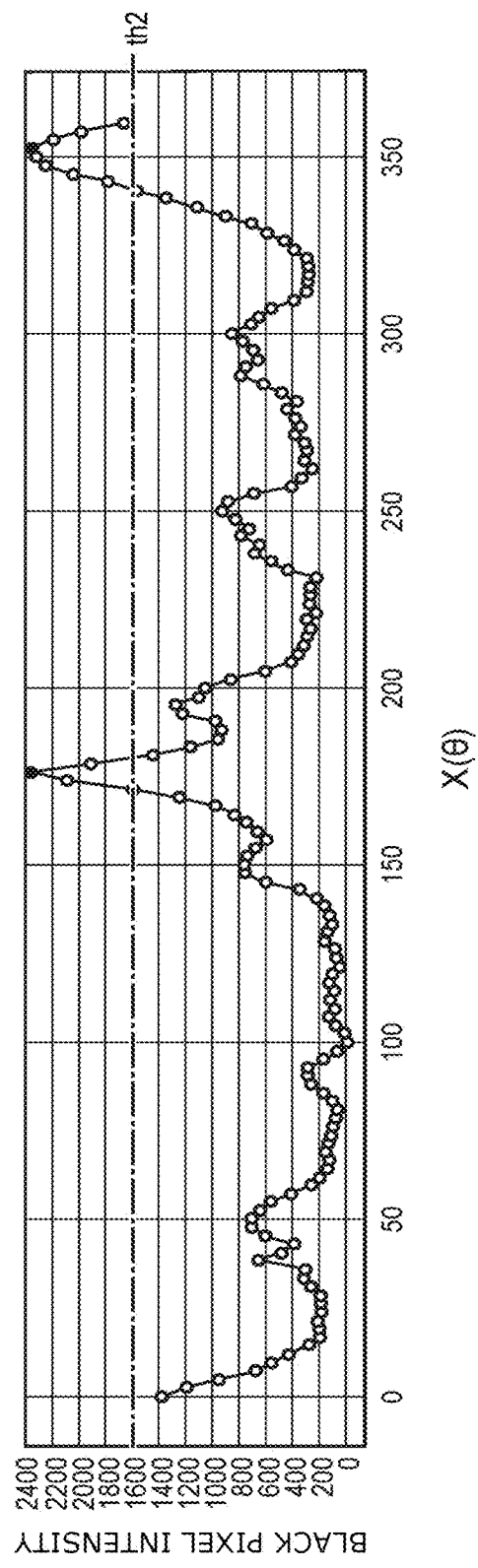
FIG. 4A and FIG. 4B are graphs illustrating an example of the calculation result relating to the luminance.
Figure 4B:
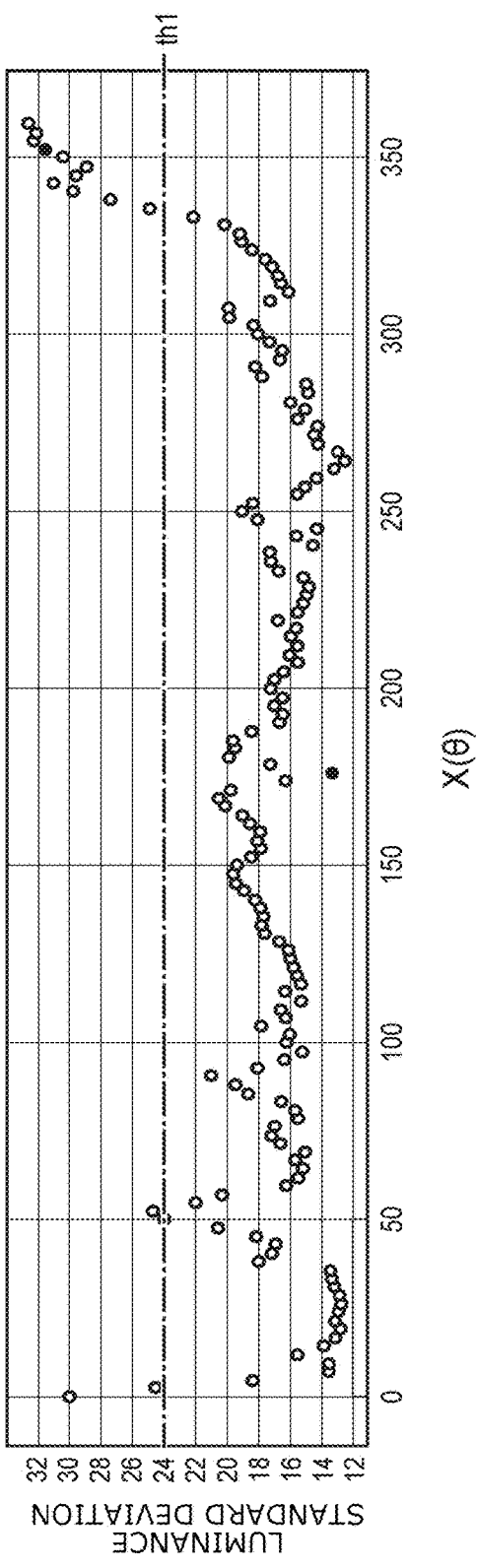

FIG. 4A and FIG. 4B are graphs illustrating an example of the calculation result relating to the luminance.

The graphs of FIG. 4A and FIG. 4B correspond to graphs of FIG. 2D. FIG. 4A illustrates the relationship between the position in the X-direction and the total value of the intensity of black in the Y-direction for the image illustrated in FIG. 2C.

The total value of the intensity of black corresponds to the total value of the luminances. The total value of the intensity of black is calculated by the following method. First, the total of the maximum values of the luminance in the Y-direction is calculated. For example, when the luminance has 256 gradations, 255 is the maximum value of the luminance. The value of the number of pixels in the Y-direction multiplied by 255 is the total of the maximum values of the luminance. Then, the total value of the luminances in the Y-direction is calculated. The value of the total value of the luminances subtracted from the total of the maximum values is the total value of the intensity of black.

As illustrated in FIG. 4A, it is desirable for a second threshold th2 to be set for the total value of the intensity of black. First, the extractor 15a extracts ranges Ra1 and Ra2 in the X-direction in which the total value of the intensity of black is greater than the second threshold th2. Then, the extractor 15a extracts the position in the X-direction where the total value of the intensity of black has a maximum in the ranges Ra1 and Ra2. According to this method, the positions at which the total values have maxima can be narrowed down, and the calculation amount can be reduced.

When many positions are extracted by the extractor 15a, there is a possibility that the discriminator 15b cannot discriminate only one position. For example, when the first threshold th1 is set as illustrated in FIG. 4B, the fluctuation of the luminances is not more than the first threshold th1 for the positions P0 and P2 to P8. Accordingly, the discriminator 15b cannot discriminate only one position.

However, by narrowing down the extracted positions, it is easier for the discriminator 15b to discriminate only one position. For example, because only the ranges Ra1 and Ra2 are searched as illustrated in FIG. 4A, only the positions P4 and P9 are extracted. As a result, even for the first threshold th1 illustrated in FIG. 4B, only the position P4 can be discriminated.

Accordingly, according to the method recited above, the accuracy of the reading of the numerical value can be increased further.

The first threshold th1 and the second threshold th2 may be preset by the user or may be set based on the calculation results of the total value of the intensity of black and the fluctuation of the luminances. For example, the extractor 15a uses 70% of the maximum value of the total values of the luminances as the second threshold th2. The discriminator 15b uses 70% of the maximum value of the fluctuations of the luminances as the first threshold th1. By setting the thresholds based on the calculation result, the position at which the pointer exists can be discriminated with higher accuracy compared to when the thresholds are prefixed. As a result, the accuracy of the reading of the numerical value can be increased further.

Here, a case is described where the total value of the luminances that is calculated is converted into the total value of the intensity of black, and the first threshold th1 is set for the total value of the intensity of black. The first threshold may be set for the calculation result of the total value of the luminances as illustrated in FIG. 2E of the luminance. In such a case, for example, the first threshold is set to the value of 30% of the greatest total value of the luminances.

In the example described above, the position at which the total value of the intensity of black has a maximum is extracted by using the total value of the intensity of black that corresponds to the total value of the luminances. Thus, other numerical values that correspond to the total value of the luminances may be used for the candidates of the positions of the pointer. Such methods can be considered to substantially extract the position at which the total value of the luminances has a minimum.

Figure 5:
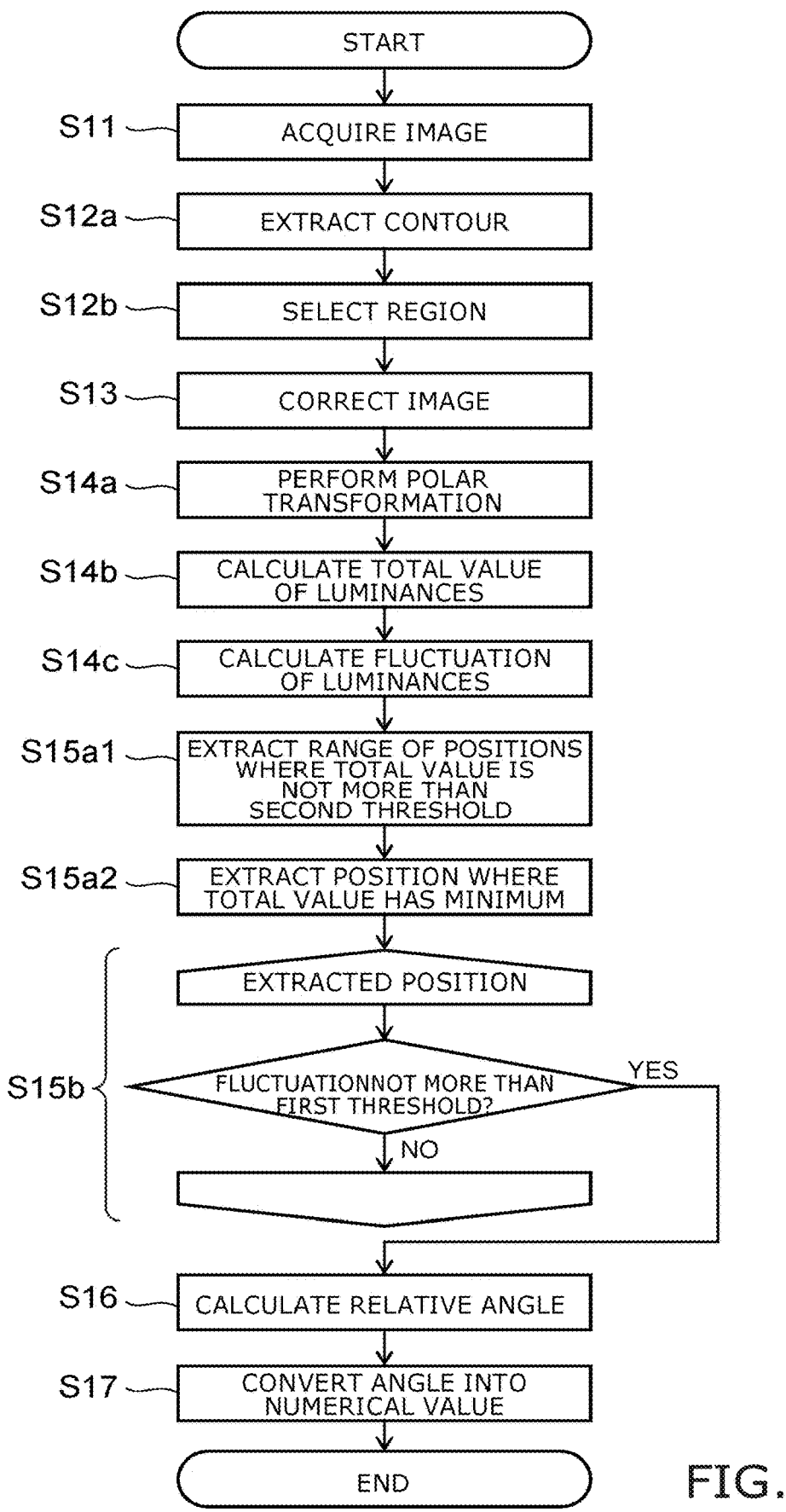
FIG. 5 is a flowchart illustrating another operation of the reading system 1 according to the embodiment.

FIG. 5 is a flowchart illustrating another operation of the reading system 1 according to the embodiment.

FIG. 5 illustrates the operation of the reading system 1 when comparing the total value of the luminances and the second threshold. In the flowchart of FIG. 5, the processing other than step S15a1 and S15a2 is similar to the flowchart of FIG. 3.

The extractor 15a compares the total value of the luminances to the second threshold at each of multiple points in the X-direction and extracts a range in the X-direction where the total values are not more than the second threshold (step S15a1). The extractor 15a extracts the positions at which the total values of the luminances have minima in the extracted range (step S15a2). From the extracted positions, the discriminator 15b discriminates the position at which the fluctuation of the luminances is not more than the first threshold (step S15b).

First Modification

Figure 6:
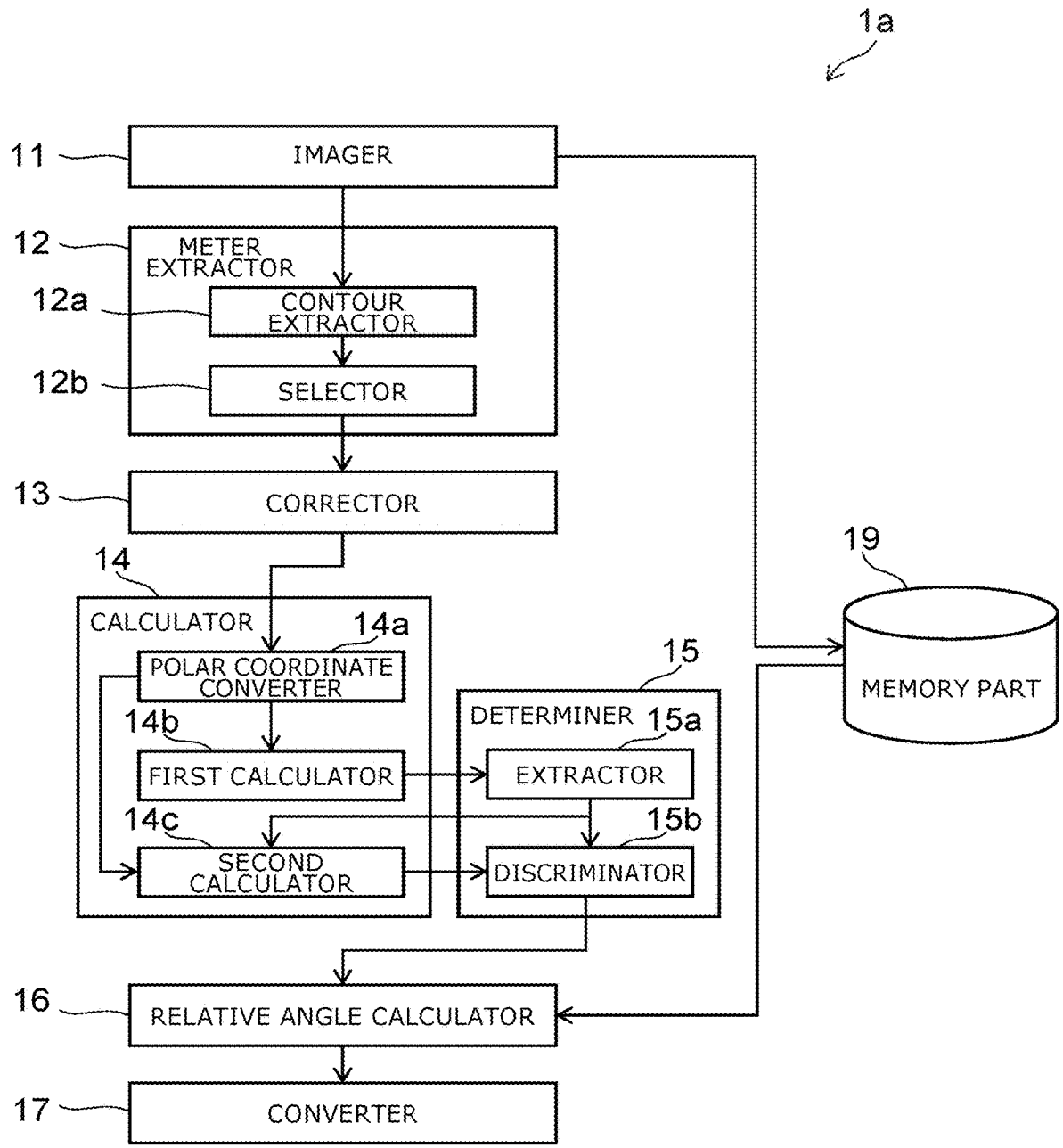
FIG. 6 is a block diagram illustrating a configuration of a reading system according to a first modification of the embodiment.

FIG. 6 is a block diagram illustrating a configuration of a reading system according to a first modification of the embodiment. In the reading system 1a, the processing of the calculator 14 is different from that of the reading system 1.

When the corrected image is input, the polar coordinate converter 14a extracts only the pixels having low luminances and performs a polar transformation of the extracted pixels. For example, when the luminance has 256 gradations, the polar transformation is performed for only the pixels having luminances of a gradation of 127 or less. When the luminance is binary, the polar transformation is performed for only the black pixels.

Based on the result of the polar transformation, the first calculator 14b calculates the total value of the luminances in the Y-direction at each of multiple points in the X-direction. In the case of the modification, only the luminances of the pixels having undergone the polar transformation are used in the calculation.

The extractor 15a extracts the position in the X-direction where the total value of the luminances has a minimum. The extractor 15a outputs the extraction result to the second calculator 14c. The second calculator 14c calculates the fluctuation of the luminances at the extracted position for the result of the polar transformation.

In the modification, the polar transformation is performed for only the pixels having low luminances; therefore, the information of the luminance exists for only a portion of the Y-direction. Therefore, for example, the second calculator 14c calculates the fluctuation of the luminances by considering the luminance to be the maximum (white) for the points where the information of the luminance does not exist. The second calculator 14c outputs the calculation result to the discriminator 15b.

From the positions extracted by the extractor 15a, the discriminator 15b discriminates the position at which the fluctuation of the luminances is smallest as the position at which the pointer exists.

According to the reading system 1a according to the modification, the polar transformation is performed for only the pixels having low luminances. Based on the extraction result of the extractor 15a, the fluctuation of the luminances is calculated for only the designated positions. Therefore, compared to the reading system 1, the calculation amount can be reduced, and the reading speed of the numerical value can be increased.

Second Modification

Figure 7:
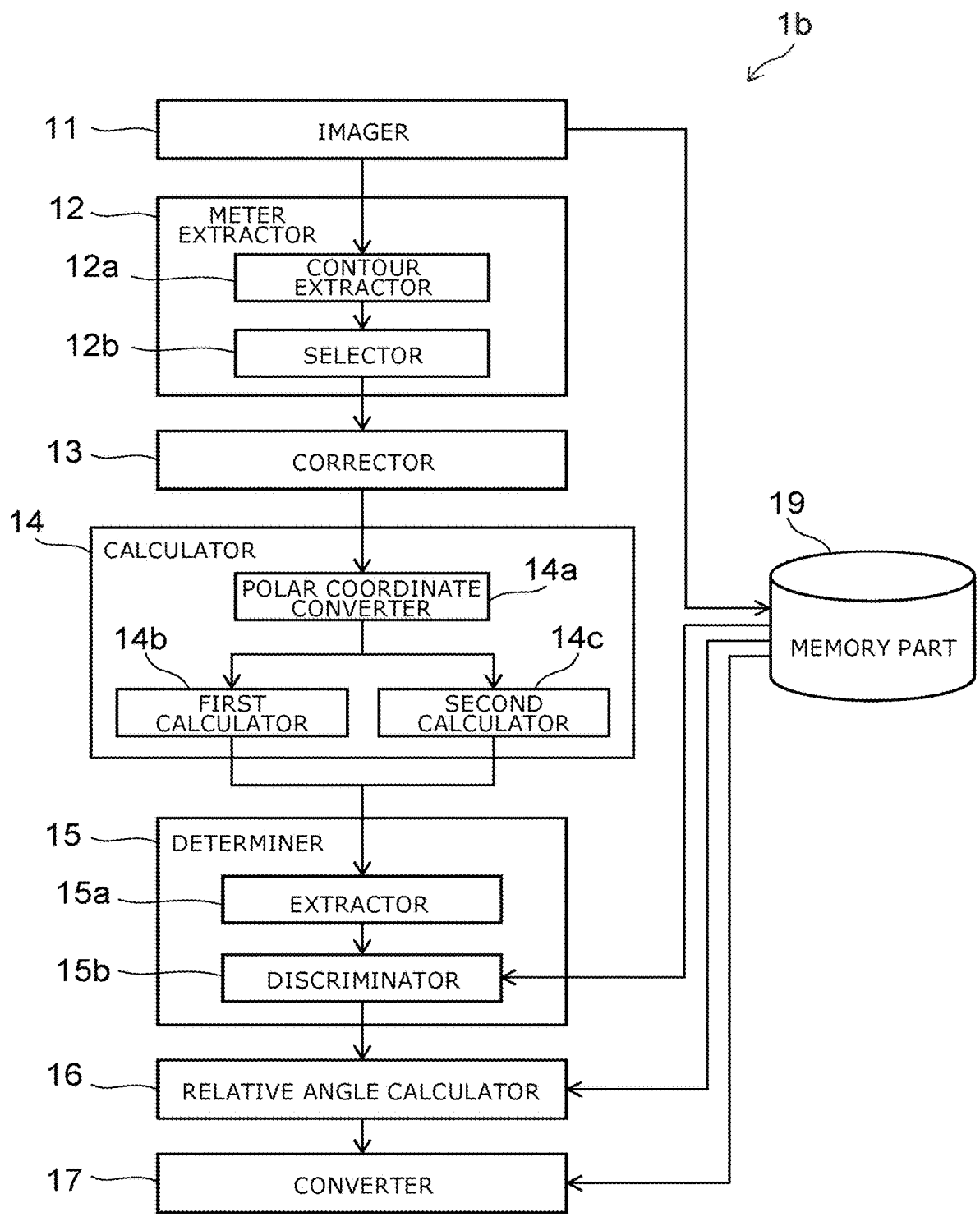
FIG. 7 is a block diagram illustrating a configuration of a reading system according to a second modification of the embodiment.

FIG. 7 is a block diagram illustrating a configuration of a reading system according to a second modification of the embodiment.

Figure 8A:
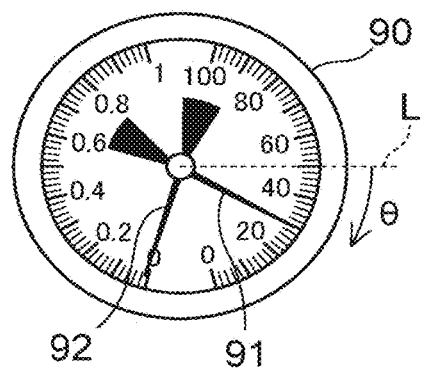
FIGS. 8A to 8C illustrate processing according to the reading system according to the second modification of the embodiment.
Figure 8B:
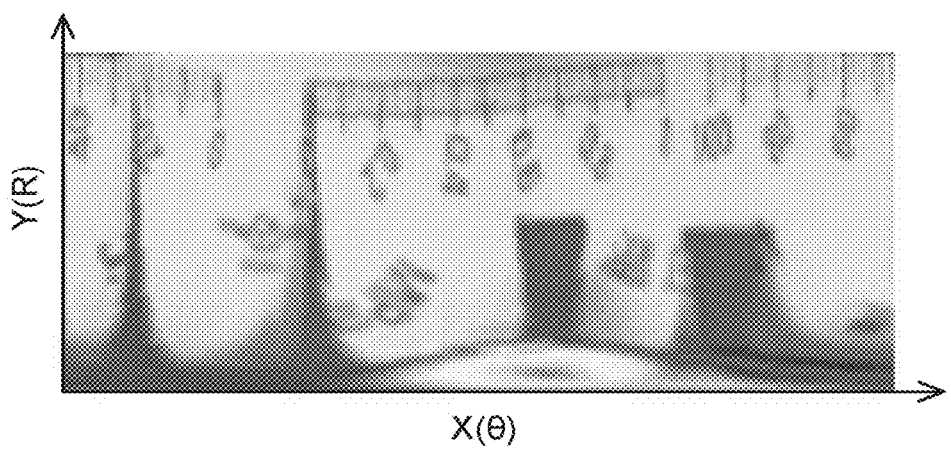
Figure 8C:
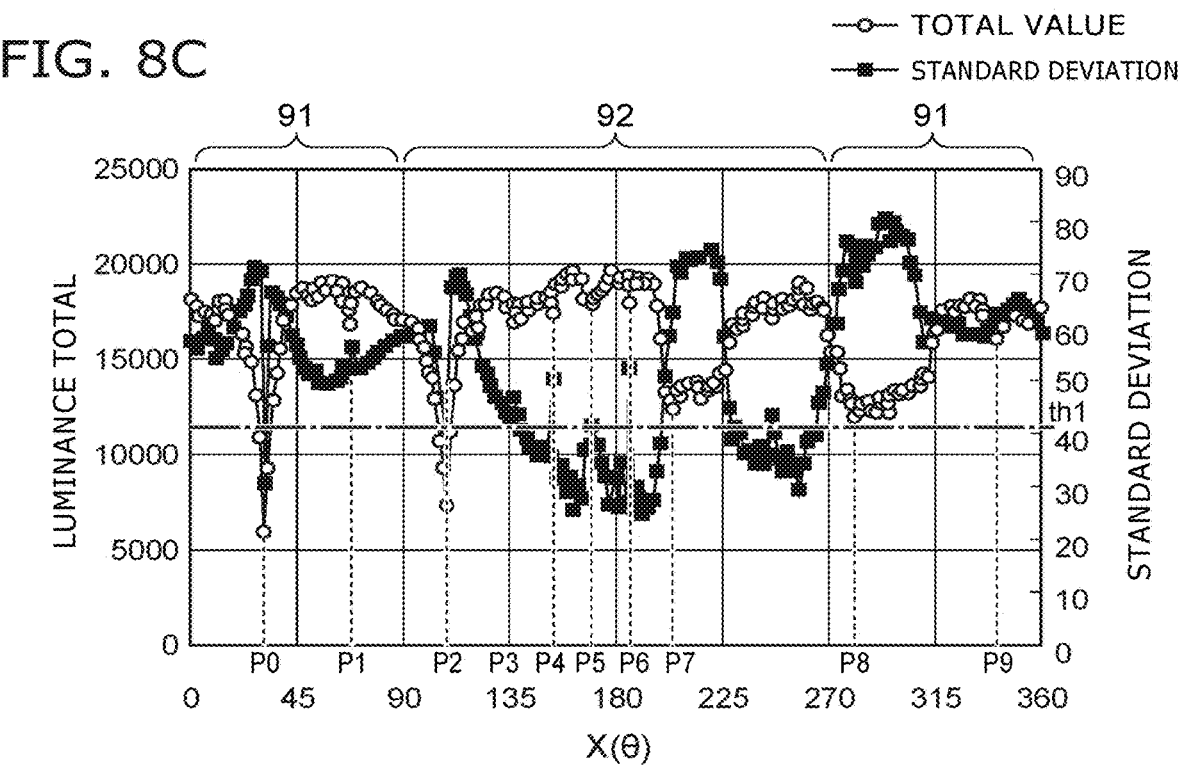

FIGS. 8A to 8C illustrate processing according to the reading system according to the second modification of the embodiment.

FIG. 8A is a front view illustrating a round meter. As illustrated in FIG. 8A, there are cases where one round meter 90 includes two pointers 91 and 92. In the example of FIG. 8A, the left side of the display panel shows the pressure, and the right side shows the temperature. In other words, the range that is indicated by the pointer 91 and the range that is indicated by the pointer 92 are separated from each other and are independent. The reading system 1b according to the second modification reads the numerical values indicated by the pointers of such a round meter.

The processing by the imager 11, the meter extractor 12, the corrector 13, and the calculator 14 in the reading system 1b is similar to that of the reading system 1. For example, the image illustrated in FIG. 8B is generated by performing a polar transformation of the image of the round meter including the two pointers.

The first calculator 14b and the second calculator 14c respectively calculate the total value of the luminances and the fluctuation of the luminances for the image after the polar transformation. FIG. 8C illustrates the calculation results of the total value of the luminances and the fluctuation of the luminances of the image illustrated in FIG. 8B. In the graph of FIG. 8C, the round plots are the total value of the luminances, and the rectangular plots are the standard deviation (the fluctuation of the luminances). The horizontal axis is the position in the X-direction (i.e., the angle). The vertical axis at the left side is the total value of the luminances. The vertical axis at the right side is the fluctuation of the luminances. For convenience, the angles that correspond to the positions are labeled at the horizontal axis of FIG. 8C.

Based on the calculation result of the first calculator 14b, the extractor 15a extracts the positions in the X-direction where the total values of the luminances in the Y-direction have minima. For example, the positions P0 to P9 are extracted as illustrated in FIG. 8C.

For example, the angle ranges where the pointers 91 and 92 exist are stored in the memory part 19 for the round meter 90. In the example illustrated in FIG. 8A to FIG. 8C, the pointer 91 exists in ranges of not less than 0 degrees but less than 90 degrees and not less than 270 degrees but less than 360 degrees when referenced to a ray L. The pointer 92 exists in a range not less than 90 degrees but less than 270 degrees.

The discriminator 15b refers to the information stored in the memory part 19 recited above and discriminates the positions at which the fluctuation of the luminances is less than the first threshold th1 in the ranges where the pointers exist. In the example illustrated in FIG. 8C, the position P0 is discriminated in the range where the pointer 91 exists, and the position P2 is discriminated in the range where the pointer 92 exists. In other words, it is determined that the pointer 91 exists at an angle corresponding to the position P0, and the pointer 92 exists at an angle corresponding to the position P2.

Thereafter, the processing for the discriminated positions (angles) is similar to that of the reading system 1. The relative angle calculator 16 detects the rotation angle of the round meter of the image and appropriately adds or subtracts relative angles to or from the angles. The converter 17 converts the corrected angles into numerical values.

The round meter has two pointers in the example described in FIGS. 8A to 8C. The reading system 1b according to the embodiment also is applicable to a round meter including three or more pointers. In such a case, the ranges where the three or more pointers exist are stored in the memory part 19. The determiner 15 determines the position at which the pointer exists for each range.

According to the modification, for a round meter that includes multiple pointers, the numerical values that are indicated by the pointers can be read with higher accuracy.

Third Modification

Figure 9:
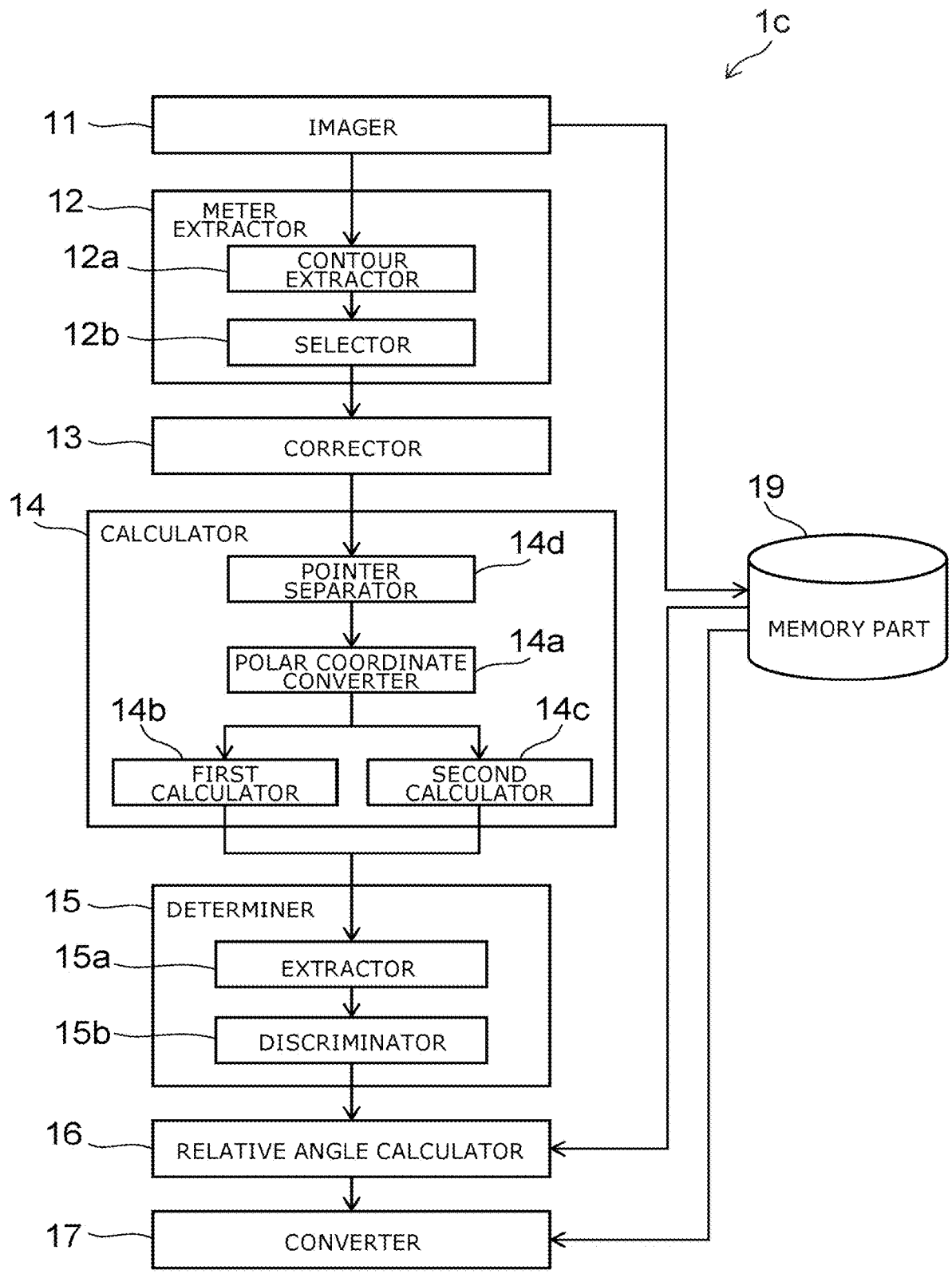
FIG. 9 is a block diagram illustrating a configuration of a reading system according to a third modification of the embodiment.

FIG. 9 is a block diagram illustrating a configuration of a reading system according to a third modification of the embodiment.

FIGS. 10A to 10D illustrate processing according to the reading system according to the third modification of the embodiment.

Figure 10A:
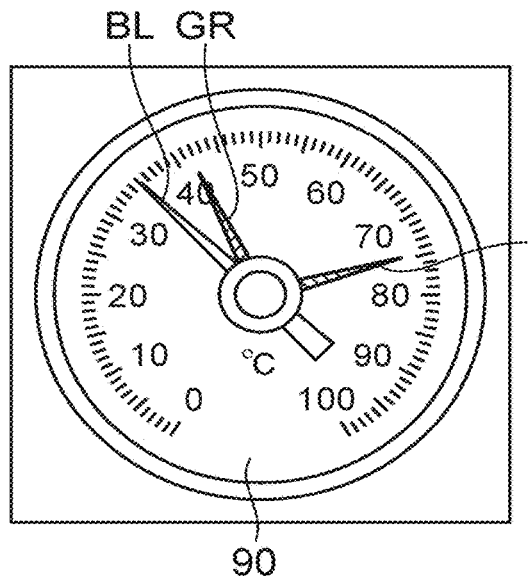
FIGS. 10A to 10D illustrate processing according to the reading system according to the third modification of the embodiment.

FIG. 10A is a front view illustrating a round meter. As illustrated in FIG. 10A, there are cases where one round meter includes multiple pointers, the indication ranges of the multiple pointers are the same, and the colors of the pointers are different from each other. In the example of FIG. 10A, the round meter 90 includes a red pointer RD, a green pointer GR, and a blue pointer BL.

For example, the round meter 90 is a temperature gauge. The pointer BL shows the current temperature. The pointer GR shows the maximum temperature recorded when measuring. The pointer RD shows the temperature at which an alarm is emitted. An alarm is emitted when the numerical value indicated by the pointer BL exceeds the numerical value indicated by the pointer RD.

In the reading system 1c according to the third modification, the calculator 14 further includes a pointer separator 14d. When the image is input from the corrector 13, the pointer separator 14d extracts the pixels that have colors in a designated hue range. The hue range is set so that the color of the pointer is included. For example, the colors of the pixels that are not extracted are set to white. A color space or a color-difference plane can be generated for each of the pointers by performing this processing for each of the colors of the pointers.

A color space is a space defined by RGB (Red Green Blue) components or HSV (Hue Saturation Value) components. A color-difference plane is, for example, a plane obtained by subtracting between the R plane, the G plane, or the B plane for the RGB color space. In such a case, six types of color-difference planes are generated. The angles of the pointers are determined by assigning the color-difference plane that has the highest sensitivity to each pointer to be read.

Figure 10C:
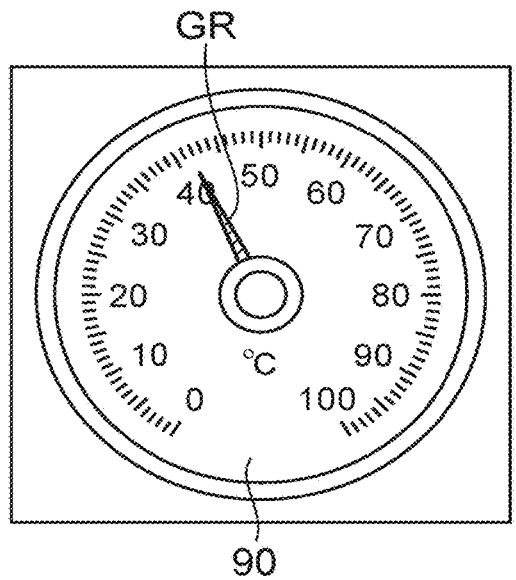
Figure 10B:
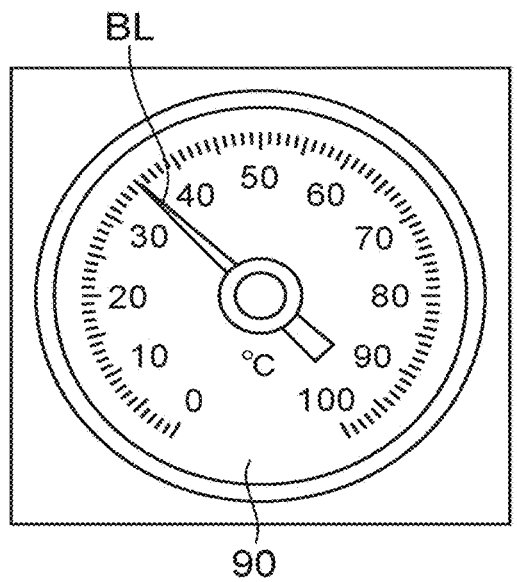
Figure 10D:
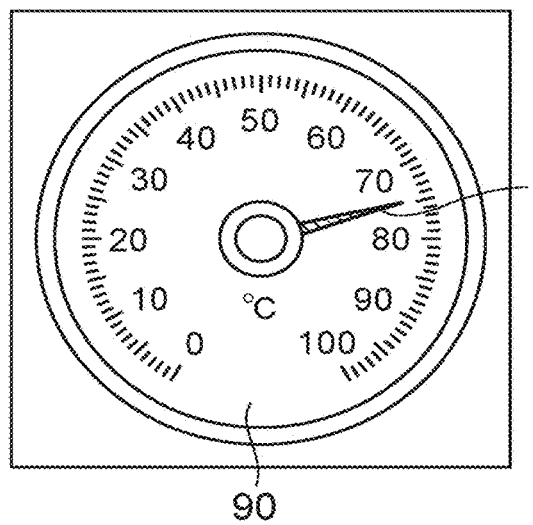

For example, as illustrated in FIG. 10B to FIG. 10D, the processing of the pointer separator 14d generates an image of the round meter 90 including only the pointer BL, an image of the round meter 90 including only the pointer GR, and an image of the round meter 90 including only the pointer RD.

When generating the color space or the color-difference plane for each pointer, the pointer separator 14d may perform HSV conversion or the like of the input image. By performing HSV conversion, for example, the image data of only red can be generated by determining the color from the hue (Hue) and by extracting the luminance (Value) in the region where the hue is red. The detection accuracy of the pointers can be increased by performing HSV processing of the image according to each of the colors of the pointers.

Processing similar to those of the reading systems 1 and 1a or 1b are performed on the image when the pointer separator 14d generates the image for each pointer. According to the modification, even when the round meter includes multiple pointers and the indication ranges of the multiple pointers are the same, the numerical values that are indicated by each of the pointers can be read.

Fourth Modification

Figure 11:
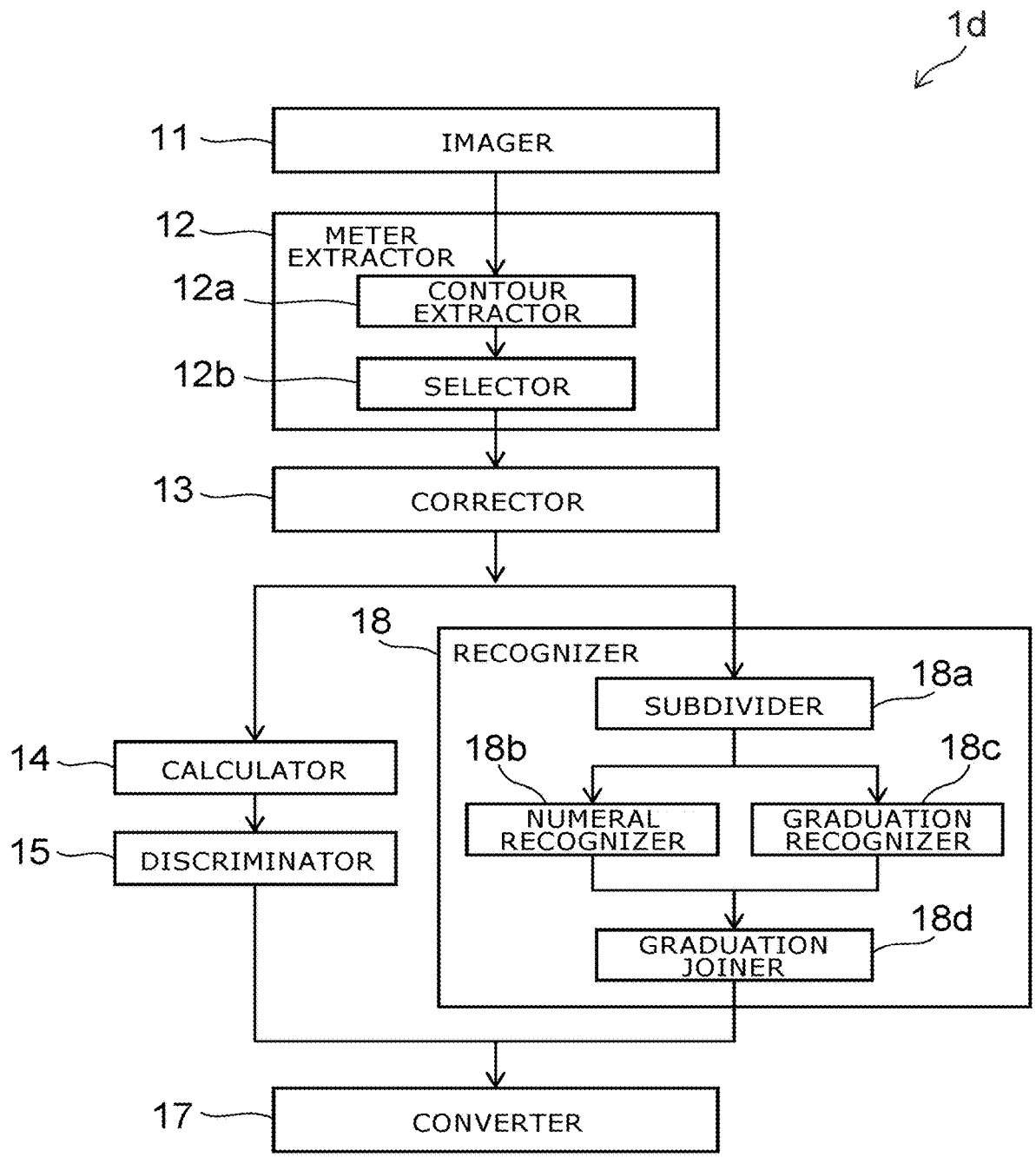
FIG. 11 is a block diagram illustrating a configuration of a reading system according to a fourth modification of the embodiment.

FIG. 11 is a block diagram illustrating a configuration of a reading system according to a fourth modification of the embodiment.

FIGS. 12A to 12D illustrate processing according to the reading system according to the fourth modification of the embodiment.

Instead of the relative angle calculator 16 and the memory part 19, the reading system 1d according to the fourth modification includes a recognizer 18. The recognizer 18 recognizes a relationship between the graduations and the numerical values of the round meter from the image corrected by the corrector 13. Specifically, the recognizer 18 includes a subdivider 18a, a graduation recognizer 18b, a numeral recognizer 18c, and a graduation joiner 18d.

Figure 12A:
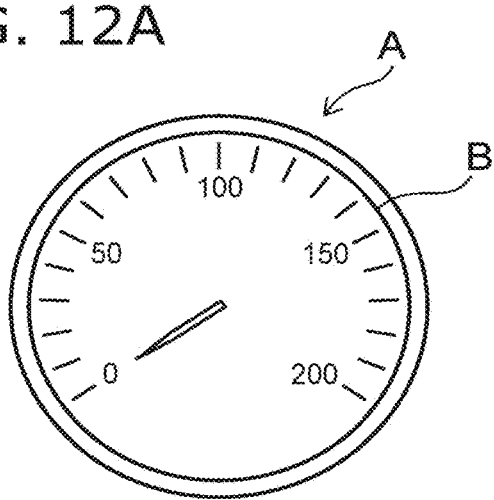
FIGS. 12A to 12D illustrate processing according to the reading system according to the fourth modification of the embodiment.
Figure 12B:
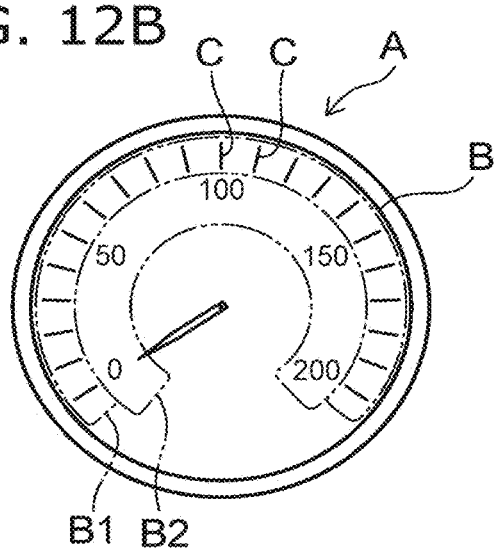

For example, an image A of the round meter illustrated in FIG. 12A is input to the subdivider 18a. The subdivider 18a extracts line components from the image, and uses a Hough transform to extract the most circular line component. As illustrated in FIG. 12B, the subdivider 18a uses the region at the outer circumference portion of the extracted circle as a scale region B1. Typically, the background of the display panel is a relatively bright color (e.g., white), and the pointer and the numerals are a relatively dark color (e.g., black). Also, the pointer is provided more toward the center of the display panel than are the graduations and the numerals. By utilizing these aspects, the subdivider 18a extracts a numeral region B2 from a region other than the scale region B1. Thereby, the graduations and the numerals are subdivided from the display panel.

For example, the graduation recognizer 18b recognizes graduations C of the display panel as illustrated in FIG. 12B from the luminance difference in the scale region B1. Based on the recognized graduations C, the graduation recognizer 18b also may determine whether or not the image A is corrected appropriately. For example, the graduation recognizer 18b causes the graduations C arranged in the circumferential direction to be arranged along one direction by performing a polar transformation. Then, the graduation recognizer 18b calculates at least one of the deviation amount of the spacing between the graduations C, the deviation amount of the widths of the graduations C, or the deviation amount of the shapes of the graduations C. The graduation recognizer 18b compares the calculated deviation amount to a preset threshold.

When the deviation amount is less than the threshold, the processing continues to read the round meter. By performing the determination recited above, the read processing can be performed for only the display panel regions B having small distortions, and the reading accuracy of the value indicated by the round meter can be increased.

When the deviation amount is not less than the threshold, the graduation recognizer 18b outputs the determination result to the corrector 13. When the determination result is input, the corrector 13 modifies the condition for correcting the image and generates another corrected image. The processing by the subdivider 18a is re-performed for the other image.

For example, the generation of the other image by the corrector 13 is repeated until the deviation amount recited above becomes less than the threshold. Or, there are cases where no deviation amount will be less than the threshold even when multiple other images are generated. In such a case, the recognizer 18 performs the processing for the image A for which the minimum deviation amount is obtained.

Figure 12C:
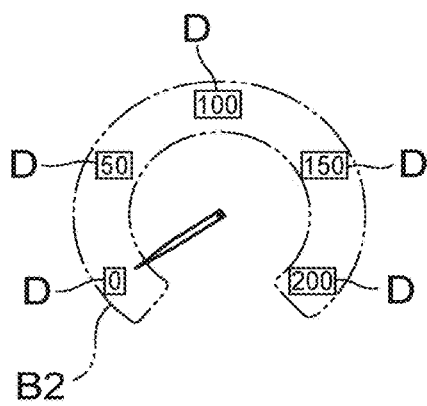

When the graduation recognizer 18*b* determines that the deviation amount is less than the threshold, the numeral recognizer 18*c* cuts out numerals from the numeral region B2. For example, as illustrated in FIG. 12C, the numeral recognizer 18*c* cuts out a rectangle D including the numerals from the numeral region B2. The numeral recognizer 18*c* recognizes the numerals included in the rectangle D.

Figure 12D:
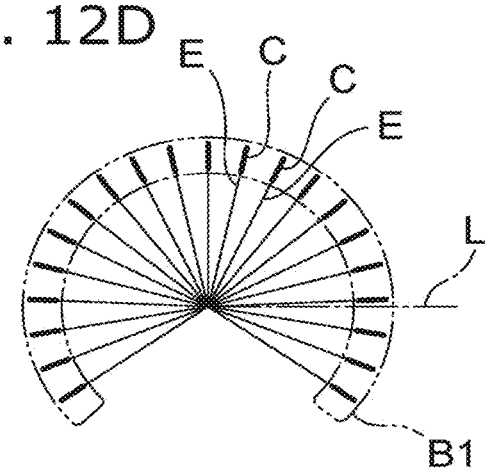

As illustrated in FIG. 12D, the graduation joiner 18*d* extracts, as position information of each graduation, the angle between the ray L and a straight line E extending through the graduation C. The graduation joiner 18*d* determines the numerals corresponding to the recognized graduations C. By the processing described above, the positions of the graduations and the correspondence between the graduations and the numerical values are recognized for the round meter that is imaged.

When the position at which the pointer output from the determiner 15 exists is converted into an angle, the converter 17 converts the angle into a numerical value by using the information acquired by the recognizer 18.

According to the modification, the numerical value that is indicated by the pointer can be read even when the positions of the graduations and the relationship between the positions of the graduations and the numerical values are not stored in the memory part 19. In the case of the modification, the image that is used in the recognition of the graduations and the numerical values and the image that is used in the angle calculation of the pointer are the same. Accordingly, the relative angle calculator 16 is unnecessary.

Figure 13:
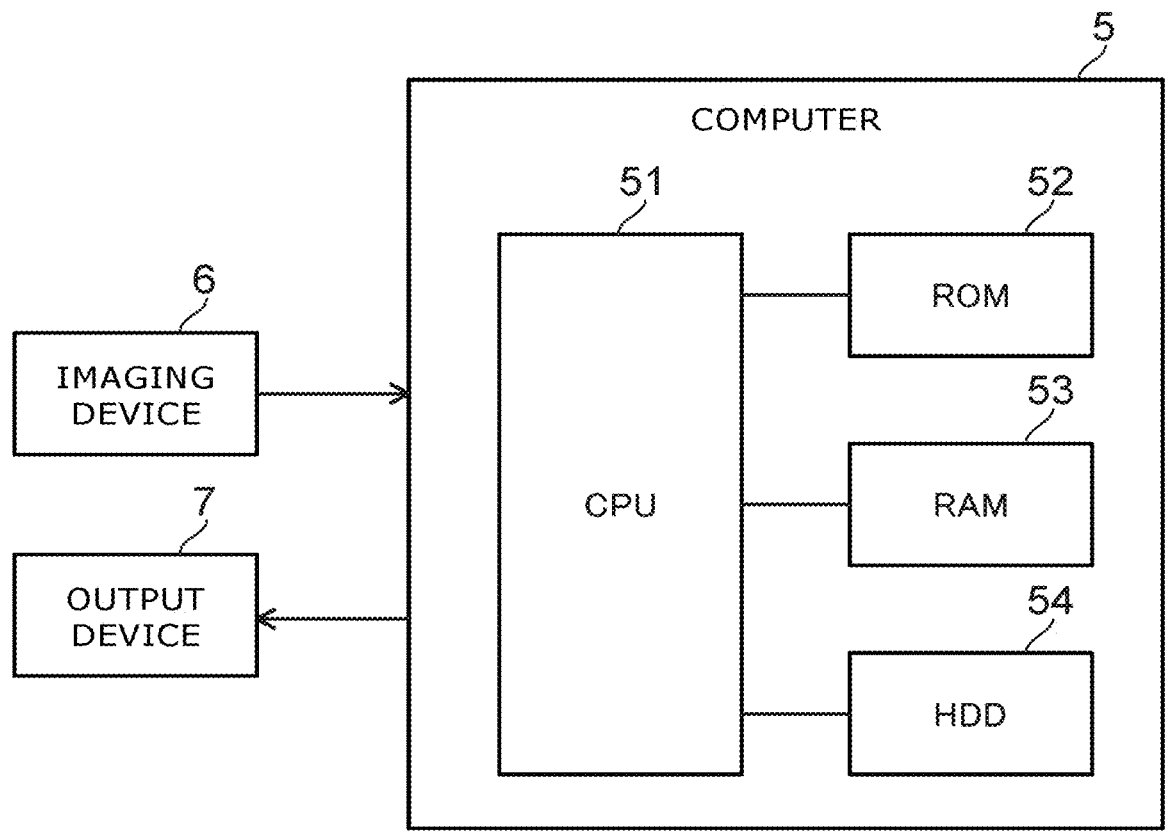
FIG. 13 is a block diagram illustrating a hardware configuration for realizing the reading systems according to the embodiments.

FIG. 13 is a block diagram illustrating a hardware configuration for realizing the reading systems according to the embodiments.

For example, the reading systems according to the embodiments include a reading device 5 and an imaging device 6 illustrated in FIG. 13. The reading device 5 is, for example, a computer and includes ROM (Read Only Memory) 51, RAM (Random Access Memory) 52, a CPU (Central Processing Unit) 53, and a HDD (Hard Disk Drive) 54.

The ROM 51 stores programs controlling the operations of the computer. The ROM 51 stores programs necessary for causing the computer to function as the meter extractor 12, the corrector 13, the calculator 14, the determiner 15, the relative angle calculator 16, the converter 17, the recognizer 18, etc., of the embodiments described above.

The RAM 52 functions as a memory region where the programs stored in the ROM 51 are loaded. The CPU 53 reads a control program stored in the ROM 51 and controls the operation of the computer according to the control program. The CPU 53 loads various data obtained by the operation of the computer into the RAM 52. The HDD 54 stores information necessary for reading and information obtained in the reading process.

Instead of the HDD 54, the reading device 5 may include another non-transitory computer-readable storage medium such as eMMC (embedded Multi Media Card), a SSD (Solid State Drive), a SSHD (Solid State Hybrid Drive), etc.

The imaging device 6 images the subject (the round meter) and transmits the acquired image to the reading device 5. The imaging device 6 is, for example, a camera.

An output device 7 outputs the data (the indicated value of the round meter that is read) output from the reading device 5 so that the user can recognize the data. The output device 7 is, for example, a monitor, a printer, a speaker, etc.

For example, the reading device 5, the imaging device 6, and the output device 7 are connected to each other by a wired or wireless technique. Or, these devices may be connected to each other via a network. Or, at least two of the reading device 5, the imaging device 6, or the output device 7 may be embedded in one device. For example, the reading device 5 may be embedded in an integral body with an image processor of the imaging device 6, etc.

By using the reading systems and the reading methods according to the embodiments described above, a numerical value that is indicated by a round meter can be read with higher accuracy. Similarly, a numerical value that is indicated by a round meter can be read by a computer with higher accuracy by using a program for causing the computer to operate as the reading system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A reading system, comprising:
a calculator calculating a total value of luminances in at least a portion of a second direction and fluctuation of the luminances in the at least a portion of the second direction at each of a plurality of points in a first direction for at least a portion of an image subjected to a polar transformation, a meter being imaged in the image, the meter including a pointer, a display panel, and a plurality of graduations, the pointer rotating around a rotation axis, the plurality of graduations being arranged along a circumferential direction around the rotation axis on the display panel, the polar transformation being referenced to a center of the meter, the first direction corresponding to the circumferential direction, the second direction corresponding to a diametrical direction from the center toward the graduations; and
a determiner using the total value and the fluctuation to determine a position at which the pointer exists.

2. The system according to claim 1, wherein
the determiner extracts positions in the first direction where the total value has extrema, and
the determiner discriminates the position at which the pointer exists from the extracted positions by using the fluctuation.

3. The system according to claim 2, wherein
a color of the display panel is brighter than a color of the pointer, and
the total value has a minimum at the position extracted by the determiner.

4. The system according to claim 2, wherein
a color of the display panel is darker than a color of the pointer, and
the total value has a maximum at the position extracted by the determiner.

5. The system according to claim 2, wherein
the determiner compares the fluctuation to a first threshold at the extracted positions and discriminates that the pointer exists at the position at which the fluctuation is not more than the first threshold.

6. The system according to claim 5, wherein the determiner sets the first threshold based on a calculation result of the fluctuation.

7. The system according to claim 2, wherein
the determiner compares the fluctuations between the extracted positions and discriminates that the pointer exists at the position at which the fluctuation is smaller.

8. The system according to claim 2, wherein
when two of the extracted positions exist at positions corresponding to diagonal in the meter, the determiner compares the fluctuations between the two positions and discriminates that the pointer exists where the fluctuation is smaller.

9. The system according to claim 2, wherein
the determiner compares the total value to a second threshold for each of the plurality of points in the first direction, extracts a range in the first direction where the total values are greater than the second threshold, and extracts the position in the range.

10. The system according to claim 9, wherein
the determiner sets the second threshold based on a calculation result of the total value.

11. The system according to claim 1, wherein
when the meter includes a plurality of the pointers and indication ranges of the plurality of pointers are separated from each other, the determiner discriminates the position at which the pointer exists from the extracted positions for each of the plurality of indication ranges.

12. The system according to claim 1, wherein
when the meter includes a plurality of the pointers and colors of the plurality of pointers are different from each other, the determiner generates a color space or a color-difference plane for each of the pointers, and discriminates the position at which the pointer exists from the extracted positions in the color space or the color-difference plane for each of the pointers.

13. The system according to claim 1, further comprising:
a relative angle calculator calculating a rotation angle of the meter; and
a converter converting an angle into a numerical value and outputting the numerical value externally,
the converter using the calculated rotation angle to convert an angle corresponding to the discriminated position into a numerical value.

14. The system according to claim 1, further comprising:
a recognizer recognizing positions of the graduations and a relationship between the graduations and numerical values in the meter; and
a converter converting an angle into a numerical value and outputting the numerical value externally,
the converter using a recognition result of the recognizer to convert an angle corresponding to the discriminated position into a numerical value.

15. The system according to claim 1, wherein
a rotation range of the pointer is 180 degrees or more.

16. The system according to claim 1, further comprising:
an imager acquiring the image by imaging the meter.

17. The system according to claim 16, wherein the imager cuts out, from a video image, the image in which the meter is imaged.

18. A reading system, comprising:
a calculator calculating a total value of luminances in at least a portion of a second direction and fluctuation of the luminances in the at least a portion of the second direction at each of a plurality of points in a first direction for at least a portion of an image subjected to a polar transformation, a meter being imaged in the image, the meter including a pointer, a display panel, and a plurality of graduations, the pointer rotating around a rotation axis, the plurality of graduations being arranged along a circumferential direction around the rotation axis on the display panel, the polar transformation being referenced to a center of the meter, the first direction corresponding to the circumferential direction, the second direction corresponding to a diametrical direction from the center toward the graduations; and
a determiner determining that the pointer exists at a position in the first direction where the total value has an extremum and the fluctuation is not more than a first threshold.

19. A reading method, comprising:
performing a polar transformation of at least a portion of an image, a meter being imaged in the image, the meter including a pointer, a display panel, and a plurality of graduations, the pointer rotating around a rotation axis, the plurality of graduations being arranged along a circumferential direction around the rotation axis on the display panel, the polar transformation being referenced to a center of the meter;
calculating a total value of luminances in at least a portion of a second direction and fluctuation of the luminances in the at least a portion of the second direction at each of a plurality of points in a first direction, the first direction corresponding to the circumferential direction, the second direction corresponding to a diametrical direction from the center toward the graduations; and
using the total value and the fluctuation to determine a position at which the pointer exists.

20. A non-transitory computer-readable storage medium storing a program,
the program causing a computer to perform the reading method according to claim 19.

21. A processor, comprising circuitry,
the circuitry being configured to
calculate a total value of luminances in at least a portion of a second direction and fluctuation of the luminances in the at least a portion of the second direction at each of a plurality of points in a first direction for at least a portion of an image subjected to a polar transformation, a meter being imaged in the image, the meter including a pointer, a display panel, and a plurality of graduations, the pointer rotating around a rotation axis, the plurality of graduations being arranged along a circumferential direction around the rotation axis on the display panel, the polar transformation being referenced to a center of the meter, the first direction corresponding to the circumferential direction, the second direction corresponding to a diametrical direction from the center toward the graduations, and
determine a position at which the pointer exists using the total value and the fluctuation.

22. The processor according to claim 21, wherein
the circuitry being configured to
extract positions in the first direction where the total value has extrema, and discriminate the position at which the pointer exists from the extracted positions by using the fluctuation.

23. The processor according to claim 21, wherein the circuitry being configured to, when the meter includes a plurality of the pointers and indication ranges of the plurality of pointers are separated from each other, discriminate the position at which the pointer exists from the extracted positions for each of the plurality of indication ranges.

24. The processor according to claim 21, wherein the circuitry being configured to, when the meter includes a plurality of the pointers and colors of the plurality of pointers are different from each other, generate a color space or a color-difference plane for each of the pointers, and discriminates the position at which the pointer exists from the extracted positions in the color space or the color-difference plane for each of the pointers.

* * * * *